(12) United States Patent
Hughes et al.

(10) Patent No.: US 9,279,736 B2
(45) Date of Patent: Mar. 8, 2016

(54) SYSTEM AND METHOD FOR CALIBRATING HYDRAULIC VALVES

(71) Applicant: Caterpillar Inc., Peoria, IL (US)

(72) Inventors: Eric C. Hughes, Metamora, IL (US); Matthew James Beschorner, Plainfield, IL (US); Justin Philip Pahl, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 636 days.

(21) Appl. No.: 13/718,529

(22) Filed: Dec. 18, 2012

(65) Prior Publication Data

US 2013/0219877 A1 Aug. 29, 2013

(51) Int. Cl.

| F15B 19/00 | (2006.01) |
| G01L 27/00 | (2006.01) |
| E02F 9/22 | (2006.01) |
| F15B 13/044 | (2006.01) |
| H04L 29/08 | (2006.01) |
| E02F 9/26 | (2006.01) |

(52) U.S. Cl.
CPC ............... *G01L 27/00* (2013.01); *E02F 9/2228* (2013.01); *E02F 9/264* (2013.01); *F15B 13/044* (2013.01); *F15B 19/002* (2013.01); *H04L 67/02* (2013.01); *F15B 2211/30575* (2013.01); *F15B 2211/40515* (2013.01); *F15B 2211/40553* (2013.01); *F15B 2211/413* (2013.01); *F15B 2211/45* (2013.01); *F15B 2211/6309* (2013.01); *F15B 2211/6313* (2013.01); *F15B 2211/80* (2013.01)

(58) Field of Classification Search
CPC .................. F15B 19/002; F15B 2211/855
USPC ............................................. 73/1.72; 60/368
See application file for complete search history.

(56) References Cited

U.S. PATENT DOCUMENTS

| 6,341,552 B1 | 1/2002 | Potter et al. |
| 6,397,655 B1 | 6/2002 | Stephenson |
| 6,631,633 B1 * | 10/2003 | Garg et al. ................... 73/1.57 |
| 7,484,429 B2 | 2/2009 | Adams et al. |
| 7,512,460 B2 | 3/2009 | Strosser et al. |
| 7,908,048 B2 | 3/2011 | Vigholm et al. |
| 7,979,165 B2 | 7/2011 | Gotoh et al. |
| 7,997,117 B2 | 8/2011 | Zhang et al. |
| 2004/0206155 A1 * | 10/2004 | Sosnowski ................... 73/1.72 |
| 2007/0044650 A1 * | 3/2007 | Kuehn et al. ................... 91/433 |
| 2009/0277243 A1 * | 11/2009 | Zhang et al. ................... 73/1.16 |
| 2011/0061448 A1 * | 3/2011 | Cadman et al. ................... 73/37 |

FOREIGN PATENT DOCUMENTS

JP 11294622 A 4/1998

* cited by examiner

*Primary Examiner* — Nathaniel Wiehe
*Assistant Examiner* — Dustin T Nguyen
(74) *Attorney, Agent, or Firm* — Miller, Matthias & Hull LLP

(57) ABSTRACT

A system and method for calibrating an electronically actuatable hydraulic valve in a work machine may include at least one supply valve and at least one drain valve to be calibrated and a bypass valve in fluid communication with a pump and a fluid source. The at least one supply valve and the at least one drain valve may be calibrated by opening the at least one supply valve and the at least one drain valve, closing the bypass valve, setting the pump to a desired flow output, determining a first current command for the at least one supply valve corresponding to a first target pressure parameter and determining a second current command for the at least one drain valve corresponding to a second target pressure parameter.

11 Claims, 4 Drawing Sheets

SYSTEM AND METHOD FOR CALIBRATING HYDRAULIC VALVES

TECHNICAL FIELD OF THE DISCLOSURE

The present disclosure relates to hydraulic valves and, more particularly, relates to a system and method for calibrating hydraulic valves.

BACKGROUND OF THE DISCLOSURE

A variety of work machines such as, loaders, excavators, motor graders, and other types of construction, work and earth moving machinery use one or more hydraulically actuatable implements for accomplishing a task. These hydraulically actuatable implements may be operated by one or more hydraulic actuators such as a cylinder and a piston assembly that divides the cylinder into two chambers. The cylinder may be in fluid communication with a hydraulic pump for providing pressurized fluid to the chambers thereof, as well as in fluid communication with a fluid source or a tank for draining pressurized fluid therefrom. A valve arrangement may be connected between the pump and the cylinder and between the cylinder and the fluid source to control the flow rate and direction of the pressurized fluid to and from the chambers of the cylinder.

Each of the valve arrangements may include one or more electrically actuated compensated valves such as, independent metering valves (IMVs) that may be independently actuated to control the flow of pressurized fluid between the pump and the fluid source via the chambers of the cylinder. The amount of the pressurized fluid flowing to/from the cylinder may be controlled by changing the displacement of a valve spool in each valve. Each valve spool may typically include a series of metering slots that control the amount of fluid flowing through that valve. Changing the displacement of the valve spool may be accomplished by using an electrically controlled solenoid wound around an armature. When current is applied to the solenoid, the armature may be moved under electro-magnetic forces generated by the solenoid to cause the associated valve spool to displace a certain amount.

For precise flow control, the spool area needs to be controlled accurately. This is particularly true for compensated valves (such as IMVs) and electronically controlled pumps, because errors in spool area or pump flow may cause high pressure drops across a pressure compensator and affect the performance of the valve components such that each valve may perform differently from the others. Furthermore, hardware tolerances, such as actuator slope, springs, spool machining, and valve body machining may have a significant effect on the spool area. As a result, the valve components may not operate predictably and the performance of the cylinder may be degraded. Thus, in order to ensure a consistent performance of the cylinder and to accurately control the flow of pressurized fluid through the valves, a calibration technique is often utilized.

A prior art calibration technique is disclosed in the U.S. Pat. No. 7,997,117 assigned to the assignee of this Application. This prior art calibration technique utilizes a bypass valve to regulate pressure of pressurized fluid through the valves (IMVs) discussed above and adjusts the current being applied to the solenoids of those valves. It then uses a hardware characteristic map to determine a calibration for the valves. While effective, regulating pressure by utilizing the bypass valve is not as accurate as possible. Moreover, the calibration routine also does not have a method for determining the correct calibration current which is as robust as possible, leading to a calibration technique that is not entirely repeatable when tested on the work machine.

It would accordingly be beneficial if an improved technique of calibrating the hydraulic valves that overcomes at least some of the disadvantages of the prior art technique discussed above were developed.

SUMMARY OF THE DISCLOSURE

In accordance with one aspect of the present disclosure, a method of calibrating an electronically actuatable hydraulic valve is disclosed. The method may include providing at least one supply valve and at least one drain valve to be calibrated in fluid communication with one another, the at least one supply valve configured to supply hydraulic fluid from a fluid source to at least one hydraulic cylinder via a pump and the at least one drain valve configured to drain hydraulic fluid from the at least one hydraulic cylinder to the fluid source. The method may also include providing a bypass valve in fluid communication with the pump and the fluid source, opening the at least one supply valve and the at least one drain valve, closing the bypass valve and setting the pump to a desired flow output. The method may further include determining a first current command for the at least one supply valve corresponding to a first target pressure parameter and determining a second current command for the at least one drain valve corresponding to a second target pressure parameter.

In accordance with another aspect of the present disclosure, a system for calibrating an electronically actuatable hydraulic valve is disclosed. The system may include at least one supply valve, at least one drain valve in fluid communication with the at least one supply valve, at least one hydraulic cylinder operatively coupled to the at least one supply valve and the at least one drain valve, a pump for pumping fluid from a fluid source through the at least one supply valve to the at least one hydraulic cylinder and a bypass valve in fluid communication with the pump and the fluid source. The system may also include a controller configured to determine a first target pressure parameter, determine a second target pressure parameter, actuate the at least one supply valve by issuing a first current command and reducing the first current command until the first target pressure is reached for a desired flow output of the pump, actuate the at least one drain valve by issuing a second current command and reducing the second current command until the second target pressure is reached for the desired flow output of the pump and adjust fluid flow through the at least one supply valve and the at least one drain valve based upon the first current command and the second current command.

In accordance with yet another aspect of the present disclosure, a work machine is disclosed. The work machine may include an engine, a work implement and a hydraulic system configured to operate the work implement and calibrate one or more hydraulic valves. The hydraulic system may include (a) at least one supply valve; (b) at least one drain valve in fluid communication with the at least one supply valve; (c) at least one hydraulic cylinder operatively coupled to the at least one supply valve and the at least one drain valve; (d) a pump for pumping fluid from a fluid source through the at least one supply valve to the at least one hydraulic cylinder; (e) a bypass valve in fluid communication with the pump and the fluid source; and (f) a controller configured to: (1) determine a first target pressure parameter; (2) determine a second target pressure parameter; (3) actuate the at least one supply valve by issuing a first current command and reducing the first current command until the first target pressure is reached for a desired flow output of the pump; (4) actuate the at least one drain valve by issuing a second current command and reducing the second current command until the second target pressure is reached for the desired flow output of the pump; and (5) adjust fluid flow through the at least one supply valve and the at least one drain valve based upon the first current command and the second current command.

These and other aspects and features of the present disclosure will be more readily understood upon reading the following description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION OF THE DISCLOSURE

The present disclosure discloses a system and method for calibrating hydraulic valves and, particularly calibrating hydraulic independent metering valves employed in a hydraulic system of a work machine. The valves may be calibrated by utilizing on-board pressure sensors, pump displacement sensors, and valve characterization maps to determine current adjustment for accurate fluid flows, as described below.

Figure 1:
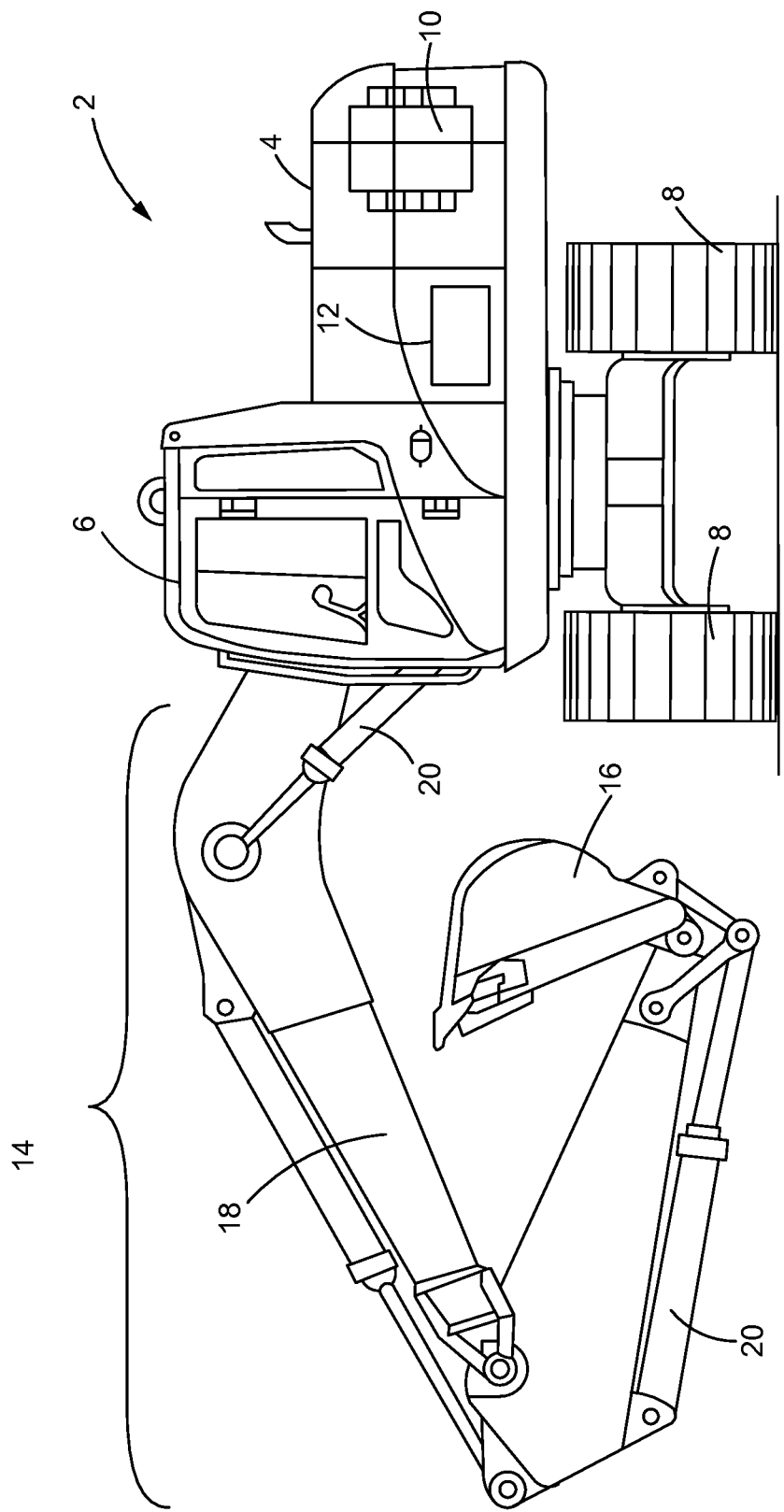
FIG. 1 is a schematic illustration of an exemplary hydraulic excavator having a hydraulic system, in accordance with at least some embodiments of the present disclosure.

Referring now to FIG. 1, an exemplary work machine 2 is shown, in accordance with at least some embodiments of the present disclosure. While the work machine 2 has been shown to be a hydraulic excavator, it will be understood that in other embodiments, the work machine may be a wheel loader, skid-steer loader, a backhoe-loader, a track or wheel type tractor or loader, a harvester, a paving machine, or any other type of work, construction, agricultural or earth moving machine that utilizes a hydraulically actuatable implement for accomplishing a task.

The work machine 2 may include an engine frame structure 4 connected at least indirectly to an operator station 6. Tracks 8 or other ground engaging mechanisms (such as wheels) may be employed for navigating the work machine 2. The engine frame structure 4 may house a power source, such as an engine 10 and other power train components (such as a transmission, not shown) for generating and delivering power to operate the work machine 2. The engine may be a gasoline, diesel, or any other type of engine that is commonly employed with such work machines. The work machine 2 may even draw power from other power sources, such as natural gas, fuel cells, etc. The engine frame structure 4 may also house a hydraulic system 12 for hydraulically actuating an implement system 14.

The implement system 14 may include a work implement, such as a bucket 16. The bucket 16 may be configured for secure attachment to the work machine 2, and for release and substitution of another implement when desired. The bucket 16 may be connected for operation to the engine frame structure 4 by one or more lift arms 18. The operation of the lift arms 18 may be controlled by one or more actuators, such as, hydraulic cylinders 20. As will be described further below, the hydraulic cylinders 20 may be extended or retracted to operate the lift arms 18. The operation of the hydraulic cylinders 20 may in turn be controlled by the hydraulic system 12 under command by an operator operating the work machine 2.

With respect to the operator station 6, although not visible, it may include a plurality of operator controls and operator interfaces for controlling the operation of the work machine 2 and the various work implements connected thereto, as well as for navigating and steering the work machine on a work surface. For instance, the operator station 6 may house various hand controlled operator interfaces, such as, joystick controls, pedals, buttons, instrument panels, gauges and warning lamps for keeping the operator aware of any critical system information, as well as safety and convenience features such as cup holders, lighters, etc. Other devices and components that commonly exist in such machines may be present in the operator station 6 of the work machine 2.

Notwithstanding the components of the work machine 2 described above, it will be understood that several other components of the work machine, as well as components that may be employed in combination or conjunction with the work machine are contemplated and considered within the scope of the present disclosure.

Figure 2:
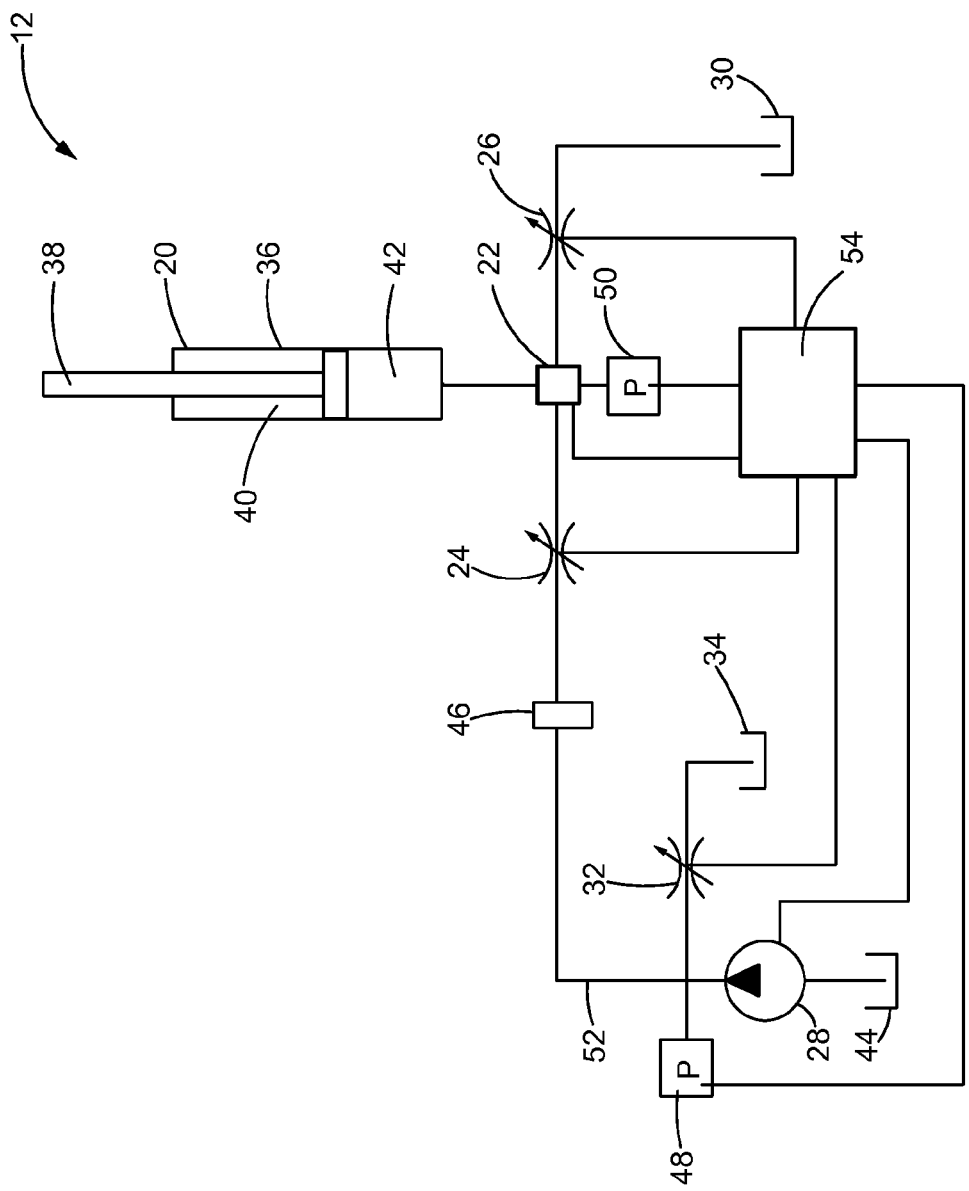
FIG. 2 is a schematic illustration of the hydraulic system of FIG. 1 that may be utilized for calibrating the hydraulic valves employed therein, in accordance with at least some embodiments of the present disclosure.

Turning now to FIG. 2, the hydraulic system 12, in accordance with at least some embodiments of the present disclosure, is shown. The hydraulic system 12 may include one or more of the hydraulic cylinders 20 (only one of which is shown), each having a work port 22. The operation of the hydraulic cylinder 20 may be controlled by a supply valve 24 and a drain valve 26. Notwithstanding the fact that in the present embodiment, only one of the supply and the drain valves 24 and 26, respectively, has been shown, in at least some embodiments, a plurality of one or both valves may be employed. Furthermore, each of the valves 24 and 26 may be an independent metering valve (IMV) capable of independent operation and configured to communicate fluid between a pump 28 and a tank 30.

Additionally, each of the supply valve 24 and the drain valve 26 may include a valve spool (not shown) and an actuator (also not shown) to control the flow of hydraulic fluid (e.g., flow rate) through the respective valve by moving the valve spool to a desired position. In order to control the movement (e.g., displacement) of the valve spool, the actuator may be electrically controlled with an armature having a solenoid wound therearound, such that by applying a current signal to the solenoid, the actuator may be actuated to displace the valve spool and vary the fluid rate of hydraulic fluid through the supply valve 24 and the drain valve 26. In other embodiments, other types of actuators may be employed as well.

With specific reference to the supply valve 24, it may be utilized to supply hydraulic fluid from the pump 28 to the hydraulic cylinder 20 and specifically, to a head end of the hydraulic cylinder. Accordingly, the supply valve 24 may be termed as a pump-to-cylinder (PC) valve. Relatedly, the drain valve 26 may be utilized to drain hydraulic fluid from a head end of the hydraulic cylinder 20 to the tank 30 and may, therefore, be termed as a cylinder-to-tank (CT) valve. It will be understood that while in the present embodiment, a supply valve supplying hydraulic fluid to a rod end of the hydraulic cylinder and a drain valve draining hydraulic fluid from the rod end of the hydraulic cylinder to the tank are not shown, such valves are nevertheless contemplated and considered within the scope of the present embodiment. The head end and the rod end of the hydraulic cylinder will be described in greater detail below.

In addition to the supply valve 24 and the drain valve 26, the hydraulic system 12 may also include a bypass valve 32. The bypass valve 32 may be similar in construction to the supply and the drain valves 24 and 26, respectively, and may be electrically controlled via a solenoid. The bypass valve 32 may be employed to transfer hydraulic fluid from the pump 28 to a tank 34. Although the tank 34 has been shown to be separate from the tank 30, it will be understood that in at least some embodiments, the tanks 30 and 34 may be one single tank.

Referring still to FIG. 2, the hydraulic cylinder 20 may include a tube 36 and a piston 38 disposed within the tube and dividing the tube into two chambers, namely, a head end chamber 40 closer to the head end of the hydraulic cylinder and a rod end chamber 42 closer to the rod end of the hydraulic cylinder. Each of the chambers 40 and 42 may be supplied with pressurized hydraulic fluid from the pump 28 through the supply valve 24 that may cause the piston 38 to be displaced axially within the tube 36 for changing the effective length of the hydraulic cylinder and causing the hydraulic cylinder to retract or expand. Fluid from the hydraulic cylinder 20 may be drained into the tank 30 through the drain valve 26. The operation of a hydraulic cylinder is well known in the art and, therefore, has not been described here in greater detail.

With respect to the pump 28, it may supply pressurized hydraulic fluid from a tank 44 to the hydraulic cylinder 20 through the supply valve 24. The pump 28 may be a variable displacement pump, although other types of pumps that are commonly employed in hydraulic systems may be employed as well. Furthermore, notwithstanding the fact that the tank 44 has been shown to be separate from the tanks 30 and 34, in at least some embodiments, the tanks 30, 34 and 44 may be a single tank from which the pump may supply fluid to the hydraulic cylinder and the hydraulic cylinder and the bypass valve 32 may drain fluid into. Moreover, one or more of the tanks 30, 34 and 44 may be reservoirs or other types of fluid sources that may be capable of storing a supply of fluid, such as, hydraulic fluid, lubrication oil, transmission oil or other types of machines oils and fluids utilized within the work machine 2.

In addition to the components described above, the hydraulic system 12 may include a compensator 46, as well as pressure sensors 48 and 50. The compensator 46 may be a mechanical device that may be utilized to control pressure drop across the supply valve 24 to provide a constant flow of fluid. Although only one of the compensators 46 has been shown, it will be understood that compensators adjacent to the drain valve 26, the bypass valve 32, as well as in other locations throughout the hydraulic system 12 may be present, as required. Relatedly, in some embodiments, the compensator 46 may not be utilized at all. With respect to the pressure sensors 48 and 50, these may be employed to determine pressure of the hydraulic fluid through various fluid passageways within the hydraulic system 12. For example, the pressure sensor 48 may be employed to determine the pressure (Ppump) in fluid passageway 52 at the outlet of the pump 28. Relatedly, the pressure sensor 50 may be employed to determine the pressure (Pport) at the work port 22, which physically connects an outlet port of the supply valve 24 to the hydraulic cylinder and also connects the hydraulic cylinder to an inlet port of the drain valve 26.

The work port 22, the supply valve 24, the drain valve 26, the bypass valve 32, the pump 28 as well as the pressure sensors 48 and 50 may be operated under control of a controller 54. The controller 54 may be an electronic control module that receives various input readings, such as from the pressure sensors 48 and 50, and generates one or more output commands (e.g., current commands) for controlling operation of the supply, drain and bypass valves 24, 26 and 32, respectively and the pump 28. By virtue of controlling the operation of the supply valve 24, the drain valve 26, the bypass valve 32 and the pump 28, the operation of the hydraulic cylinder 20 may be controlled. The controller 54 may be configured to receive commands from an operator to control operation of the aforementioned components.

To that end, the controller 54 may be a stand-alone embedded or general purpose processing system having any of a variety of volatile or non-volatile memory/storage devices, such as, flash memory, read only memory (ROM), programmable read only memory (PROM), erasable programmable read only memory (EPROM), electronically erasable programmable read only memory (EEPROM), etc., processing devices, such as, microprocessors and central processing units, and computer readable media, such as, joy sticks, flash drives, optical disc drives, floppy discs, magnetic tapes, drums, cards, etc., as well as output and display devices such as monitors and printers. Other types of computing, processing as well as reporting and storage devices may be present within (or used in conjunction with) the controller 54. The controller 54 may run one or more software programs or applications stored in a memory location, read from a computer readable medium, and/or accessed from an external device operatively coupled to the controller by any suitable communication network.

Thus in operation, the controller 54 may receive input(s) (e.g., to calibrate valves, move the implement system 14, etc.) from an operator and may send out output commands (e.g., current commands) to one or more of the actuators of the valves 24, 26 and 32 for actuating the hydraulic cylinder 20. In response to the output commands, one or more of the actuators may apply a varying force to controllably move their respective valve spools to achieve a desired displacement of the valves for controlling fluid flow through the hydraulic cylinder 20.

Figure 3:
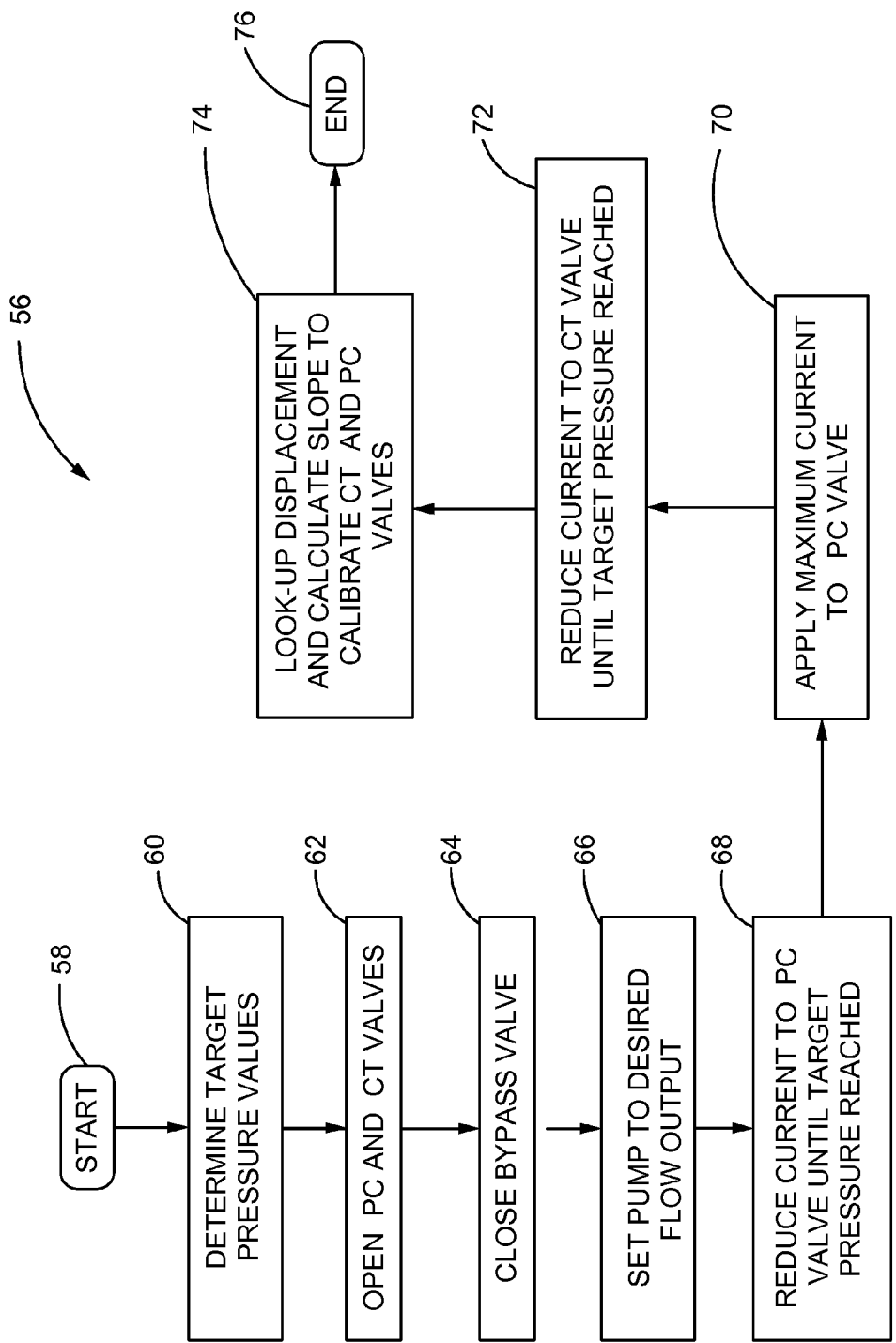
FIG. 3 is a flowchart showing exemplary steps of calibrating the hydraulic valves of FIG. 2.

Turning now to FIG. 3 and referring to it in conjunction with FIG. 2, a flowchart 56 outlining steps of calibrating the supply valve 24 and the drain valve 26 will be described in accordance with at least some embodiments of the present disclosure. Specifically, the calibration of the supply valve 24 and the drain valve 26 may be performed by setting a desired fluid flow (e.g., desired output from the pump 28) and a target pressure parameter and adjusting the solenoid current value (of the actuators of the supply and the drain valves) to correspond to the target pressure parameter. The values of the adjusted solenoid current, the pump fluid flow output and the target pressure parameter may then be utilized to look-up valve spool displacement and valve spool area from a valve characterization map for accurately controlling the flow of fluid through the supply valve 24 and the drain valve 26. During calibration of the valves 24 and 26, the hydraulic cylinder 20 may remain in a non-operative state, that is, no fluid flow may occur through the hydraulic cylinder. In other words, fluid flows from the pump 28 to the supply valve 24 and directly to the drain valve 26 and the tank 30 without passing through the hydraulic cylinder 20. Furthermore, the supply valve 24 and the drain valve 26 may be calibrated one at a time.

Thus, after starting at a step 58, the target pressure parameters may first be determined at a step 60. The target pressure parameters may include a target PC pressure, which may be defined as the pressure across the valve spool of the supply valve 24 and abbreviated as $\Delta Ppc$. The target PC pressure may be calculated by utilizing the equation:

$$\Delta Ppc = Ppump - Pport$$

where Ppump is the pressure at the outlet of the pump 28 as determined by the pressure sensor 48; and Pport is the pressure across the work port 22 as determined by the pressure sensor 50.

The target pressure parameters may also include the target CT pressure, which may be defined as the pressure at the work port 22 as controlled by the valve spool of the drain valve 26. The target CT pressure may be determined as $Pct = Pport$. The pressure across the work port 22 may be utilized as the target PC pressure since the pressure at the tank 30 may be assumed to be constant. The values of Pport and Ppump to calculate $\Delta Ppc$ and Pct for target pressure parameters may be determined by analyzing the spool area curves of the supply valve 24 and the drain valve 26, as well as the operating conditions of the work machine 2 to determine the best/least sensitive operating points relative to current or flow variations before calibrating those valves.

After calculating the target pressure parameters, at steps 62-68, the supply valve 24 may be first calibrated. Specifically, at the step 62, the supply and the drain valves 24 and 26, respectively, may be both opened. When not in use, the supply valve 24 and the drain valve 26 are normally in a closed position or in other words, in a zero energy state. In this closed state, no fluid flow occurs through those valves. The supply valve 24 and the drain valve 26 may be opened when it is desired to calibrate one or both of those valves. Opening the supply and the drain valves 24 and 26, respectively, may be facilitated by way of a current command issued by the controller 54 to the actuators (e.g., solenoid) of those valves, causing the actuators to move their respective valve spools for facilitating fluid flow through the valves.

Accordingly, to calibrate the supply valve 24, both the supply valve and the drain valve 26 may be opened by applying a current to their respective solenoid actuators. The current may be the current value required to open the supply valve 24 and the drain valve 26 completely for facilitating a maximum flow of fluid therethrough. The value of the current may depend upon the physical limit of the respective actuator of the valves 24 and 26, and/or the maximum current capacity that the controller 54 may be capable of generating. By virtue of opening the supply valve 24 and the drain valve 26, a fluid passage from the pump 28 to the tank 30 may be created (since the hydraulic cylinder 20 is in a non-operative state).

Next, at the step 64, the bypass valve 32 may be closed by applying a current (e.g., two thousand MilliAmperes) to its solenoid actuator. By virtue of closing the bypass valve 32, it may be ensured that substantially all of the fluid flow from the pump 28 passes through the supply valve 24 and the drain valve 26 and none of it passes through the bypass valve to the tank 34. It will be understood that in contrast to the supply and the drain valves 24 and 26, respectively, which are normally in a closed state, the bypass valve is normally in an open state, that is, the fluid flows through the bypass valve from the pump 28 to the tank 34. When it is desired to close the bypass valve 32, the controller 54 may generate a current command (current value to completely close the bypass valve and restrict flow of fluid therethrough) to actuate the solenoid of the bypass valve, which in turn may move the associated valve spool to close the bypass valve. Similar to the current value for opening the supply valve 24 and the drain valve 26, the current value for closing the bypass valve 32 may depend upon the physical limit of the actuator of the bypass valve and/or the controller 54.

Thus, by opening the supply valve 24 and the drain valve 26 at the step 62 and by closing the bypass valve 32 at the step 64, substantially the entire fluid from the pump 28 may flow through the supply and the drain valves. Thereafter, the pump 28 may be set to a desired flow output at the step 66. The desired flow output of the pump 28 may be near a maximum pump capability, that is, the maximum amount of fluid that the pump may be capable of flowing from the tank 44. The maximum pump capability may be based upon the maximum displacement that the pump hardware may be configured for in volumes per revolution. After setting the desired flow output of the pump 28 at the step 66, a current command may be issued by the controller 54 to the supply valve 24 at the step 68.

The current command issued by the controller 54 to the supply valve 24 may be gradually reduced to gradually close the supply valve until the valve spool of the supply valve reaches the target pressure parameter of $\Delta Ppc$. While the current to the supply valve 24 is being reduced, the drain valve 26 may be kept open by applying current to its actuator. When the target pressure parameter of $\Delta Ppc$ at the supply valve 24 is reached, the corresponding value of the current command is recorded for use later, as described further below.

Next, at steps 70-72, the drain valve 26 may be calibrated by following a similar procedure as the supply valve 24 above. Specifically, at the step 70, a current is applied to the supply valve 24 to completely open that valve. The drain valve 26 is already completely open at this time from the step 62. After opening the supply valve 24, a current command is applied to the drain valve 26 by the controller 54 to gradually close the drain valve. The current command is gradually reduced until the target pressure parameter of Pct is not reached. When the target pressure parameter Pct is reached, the corresponding value of the current command is recorded.

Thus, by following the steps 60-72, the following parameters may be found: pump flow output, target pressure parameters of $\Delta Ppc$ and Pct and values of current command corresponding to those target pressure parameters of the supply valve 24 and the drain valve 26. Furthermore, the steps 60-72 may typically be used to determine one calibration point for each of the supply valve 24 and the drain valve 26. In at least some embodiments, more than one calibration point may need to be determined in order to calibrate those valves. In those instances, the steps 60-72 may be repeated multiple times. Thus, for example, to determine an "X" number of calibration points, the steps 60-72 may be repeated "X" number of times.

The calibration point value(s) determined from the steps 60-72 may then be utilized by the controller 54 to more accurately control the flow of fluid through the supply valve 24 and the drain valve 26, as well as to look-up spool displacement and spool area from a valve characterization map. The current, spool displacement and spool area may then be plotted on a graph (See FIG. 5) to calculate a slope and utilize the slope to effectively control the operation and fluid flow of the supply and the drain valves 24 and 26, respectively. The process then ends at a step 76.

Figure 5:
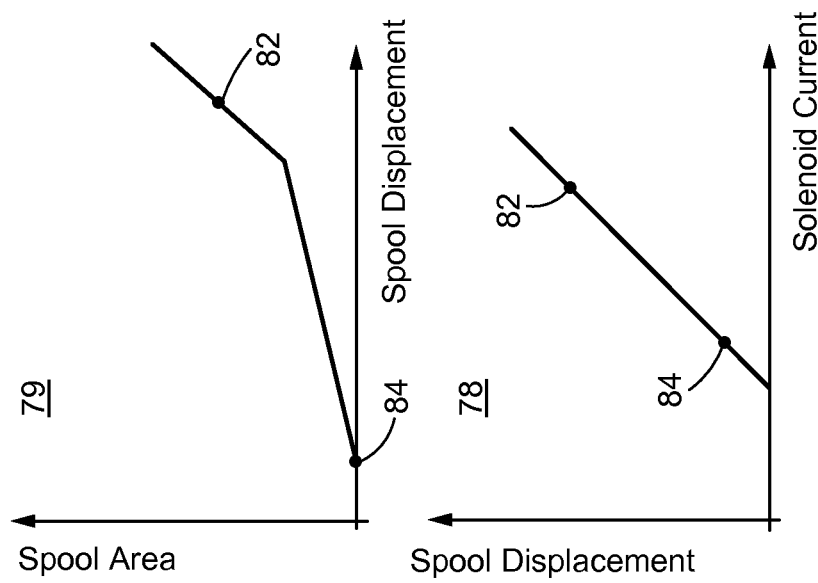
FIG. 5 is a graphical illustration representing a relationship between current and spool displacement and a relationship between spool displacement and spool area of a calibrated hydraulic valve.
Figure 4:
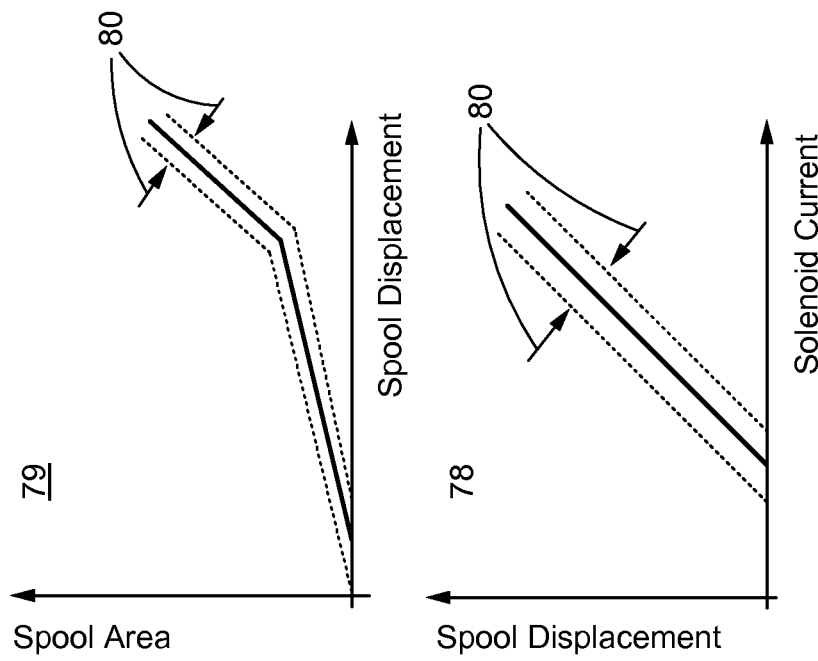
FIG. 4 is a graphical illustration representing a relationship between current and spool displacement and a relationship between spool displacement and spool area of a non-calibrated hydraulic valve.

Turning now to FIGS. 4 and 5, graphical representations comparing a non-calibrated valve (whether supply or drain) with a calibrated valve are shown, in accordance with at least some embodiments of the present disclosure. Specifically, FIG. 4 shows the relationship between the current determined above and the spool displacement from the valve characterization map, as well a relationship between the spool displacement and the spool area for a non-calibrated valve, while FIG. 5 shows the same relationships in a calibrated valve.

Graph 78 plots current on the X-Axis against spool displacement on the Y-Axis, while graph 79 plots spool displacement on the X-Axis against spool area on the Y-Axis. Graphs 78 and 79 of FIG. 4 shows various hardware tolerances 80 that may arise from actuator slopes, springs, spool machining, valve body machining, and the like and that may have a significant effect on the spool area of the supply valve 24 and the drain valve 26. To adjust for these tolerances 80, the supply valve 24 and the drain valve 26 may be calibrated as described above. The current command values that are determined above may constitute an additional operating point or a second calibration point to accurately control the supply valve 24 and the drain valve 26 and account for the tolerances 80, as shown in the graphs 78 and 79 of FIG. 5. The second calibration point is shown in the graphs 78 and 79 of FIG. 5 by reference numeral 82. The first calibration point, also known as cracking calibration 84, is the current command that corresponds to start of area or fluid flow in the supply valve 24 and/or the drain valve 26. Determination of the cracking calibration 84 is beyond the scope of this disclosure and is, therefore, not discussed here. Knowing the cracking calibration 84 and calculating the second point calibration 82 discussed above, the slope of the plots 78 and 79 may be calculated and fed into the controller 54 for effectively controlling the flow of fluid through the supply and the drain valves 24 and 26, respectively.

INDUSTRIAL APPLICABILITY

In general, the present disclosure sets forth an electro-hydraulic system having at least one supply valve and at least one drain valve, each using a solenoid actuator to convert electrical current to main valve spool area for varying fluid flow to one or more hydraulic cylinders. For precise control of fluid flow through the valves, the spool area needs to be controlled accurately. Controlling the spool area accurately may be achieved by determining a second point calibration and utilizing the second point calibration along with a cracking calibration to control the spool area. The second point calibration may be obtained by first setting target pressure parameters and fluid pump flow and obtaining current commands corresponding to the target pressure sensors at the supply valve and the drain valve. It will be understood that when more than one of each of the supply and the drain valves are present, the process described above may be repeated for each valve within the hydraulic system.

Thus, by utilizing the method described above, the supply and the drain valves may be calibrated one at a time to improve the performance of the hydraulic cylinders and, therefore, the performance of the associated hydraulic system and the work machine.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method of calibrating an electronically actuatable hydraulic valve, the method comprising:
   providing at least one supply valve and at least one drain valve to be calibrated in fluid communication with one another, the at least one supply valve configured to supply hydraulic fluid from a fluid source to at least one hydraulic cylinder via a pump and the at least one drain valve configured to drain hydraulic fluid from the at least one hydraulic cylinder to the fluid source;
   providing a bypass valve in fluid communication with the pump and the fluid source;
   opening the at least one supply valve and the at least one drain valve;
   closing the bypass valve;
   setting the pump to a desired flow output;
   determining a first current command for the at least one supply valve corresponding to a first target pressure parameter; and
   determining a second current command for the at least one drain valve corresponding to a second target pressure parameter.

2. The method of claim 1, wherein opening the at least one supply valve and the at least one drain valve comprises applying a current to an actuator of the at least one supply valve and the at least one drain valve to facilitate flow of hydraulic fluid therethrough.

3. The method of claim 1, wherein closing the bypass valve comprises applying a current to an actuator of the bypass valve for restricting flow of hydraulic fluid therethrough.

4. The method of claim 1, wherein by opening the at least one supply valve and the at least one drain valve, a fluid pathway from the pump to the fluid source is created.

5. The method of claim 1, wherein the first target pressure parameter comprises a pressure across the at least one supply valve, the first target pressure parameter being calculated by the difference of a pump outlet pressure and a work port pressure.

6. The method of claim 1, wherein the second target pressure parameter comprises a pressure at the at least one drain valve and is equal to a work port pressure.

7. The method of claim 1, wherein determining the first current command comprises gradually reducing current to the at least one supply valve until the first target pressure parameter is reached.

8. The method of claim 1, wherein determining the second current command comprises:
   opening the at least one supply valve; and
   reducing current to the at least one drain valve gradually until the second target pressure parameter is reached.

9. The method of claim 1, wherein the first current command and the second current command constitute a second point calibration, the first current command being used to determine a spool displacement and a spool area of the at least one supply valve from a valve characterization map and the second current command being used to determine the spool displacement and the spool area of the at least one drain valve from the valve characterization map.

10. The method of claim 9, wherein the second point calibration is utilized to account for hardware tolerances in the at least one supply valve and the at least one drain valve.

11. The method of claim 1, wherein the at least one hydraulic cylinder is kept in a non-operative state during calibration of the at least one supply valve and the at least one drain valve.

* * * * *